(12) United States Patent
Aoki et al.

(10) Patent No.: US 11,898,043 B2
(45) Date of Patent: Feb. 13, 2024

(54) INK JET INK COMPOSITION SET AND INK JET RECORDING METHOD

(71) Applicant: Seiko Epson Corporation, Tokyo (JP)

(72) Inventors: Kazuto Aoki, Shiojiri (JP); Ryota Miyasa, Matsumoto (JP); Hideki Okada, Shiojiri (JP); Masakazu Ohashi, Shiojiri (JP)

(73) Assignee: SEIKO EPSON CORPORATION

(*) Notice: Subject to any disclaimer, the term of this patent is extended or adjusted under 35 U.S.C. 154(b) by 233 days.

(21) Appl. No.: 17/460,939

(22) Filed: Aug. 30, 2021

(65) Prior Publication Data

US 2022/0064465 A1  Mar. 3, 2022

(30) Foreign Application Priority Data

Aug. 31, 2020  (JP) ................ 2020-145443

(51) Int. Cl.
*C09D 11/322* (2014.01)
*D06P 5/30* (2006.01)
*C09D 11/40* (2014.01)

(52) U.S. Cl.
CPC ............ *C09D 11/322* (2013.01); *C09D 11/40* (2013.01); *D06P 5/30* (2013.01)

(58) Field of Classification Search
CPC ....... C09D 11/322; C09D 11/40; C09D 11/30; C09D 11/037; C09D 11/32; C09D 17/00; C09D 17/008; B41J 2/01; B41J 2/2117; B41M 5/5218
See application file for complete search history.

(56) References Cited

U.S. PATENT DOCUMENTS

| | | | | |
|---|---|---|---|---|
| 5,663,224 A | * | 9/1997 | Emmons | C08J 3/215 523/210 |
| 5,879,512 A | * | 3/1999 | McGenity | D21H 19/42 252/607 |
| 6,916,514 B2 | * | 7/2005 | Bringley | B41M 5/5218 428/407 |
| 8,348,411 B2 | * | 1/2013 | Brust | C09D 11/38 347/100 |
| 9,873,814 B2 | * | 1/2018 | Kagata | C09D 133/08 |
| 2003/0010252 A1 | * | 1/2003 | Arita | C09D 11/32 106/31.86 |
| 2003/0097958 A1 | * | 5/2003 | Yu | C09D 11/322 106/504 |
| 2006/0189715 A1 | * | 8/2006 | Ishibashi | C09D 11/101 523/160 |
| 2012/0241695 A1 | * | 9/2012 | Zhou | C09D 11/36 252/500 |
| 2013/0182057 A1 | * | 7/2013 | Koase | B41J 11/0022 347/102 |
| 2014/0015895 A1 | * | 1/2014 | Okamura | C09D 11/322 347/100 |
| 2014/0192112 A1 | * | 7/2014 | Nagashima | B41M 5/0017 347/21 |
| 2019/0345354 A1 | * | 11/2019 | Huang | C09D 11/03 |
| 2020/0023648 A1 | * | 1/2020 | Gotou | B41J 2/145 |

FOREIGN PATENT DOCUMENTS

JP   2019-196482 A   11/2019

* cited by examiner

*Primary Examiner* — John Zimmermann
(74) *Attorney, Agent, or Firm* — Harness, Dickey & Pierce, P.L.C.

(57) ABSTRACT

An ink jet ink composition set includes a white ink jet ink composition and a nonwhite ink jet ink composition. The white ink jet ink composition contains a white pigment, resin particles, and water, and the nonwhite ink jet ink composition contains a nonwhite pigment, resin particles, and water. The white pigment has cation responsiveness, and the absolute value of zeta potential of the white pigment is lower than the absolute value of zeta potential of the nonwhite pigment.

11 Claims, No Drawings

INK JET INK COMPOSITION SET AND INK JET RECORDING METHOD

The present application is based on, and claims priority from JP Application Serial Number 2020-145443, filed Aug. 31, 2020, the disclosure of which is hereby incorporated by reference herein in its entirety.

BACKGROUND

1. Technical Field

The present disclosure relates to an ink jet ink composition set and an ink jet recording method.

2. Related Art

Attempts are made to apply an ink jet recording method to not only recording of images on media such as paper and the like, but also to textile printing on fabrics, and various ink compositions and recording methods are investigated for ink jet texture printing. For example, JP-A-2019-196482 describes that in the case of textile printing on a colored fabric, an attempt is made to adhere a white ink jet ink composition and then adhere a color ink composition on the white ink jet ink composition.

JP-A-2019-196482 also describes that a color image with high visibility can be recorded by using a white image as a background image. The same document also describes that the whiteness of the white image can be improved by using a specific dispersant and wetting agent for the white ink jet ink composition.

The technique described in JP-A-2019-196482 improves the whiteness of the white image formed by the white ink jet ink composition, but the color image formed by the color ink composition overlapping the white image may have a lack of color development.

SUMMARY

According to an aspect of the present disclosure, an ink jet ink composition set includes a white ink jet ink composition and a nonwhite ink jet ink composition. The white ink jet ink composition contains a white pigment, resin particles, and water, and the nonwhite ink jet ink composition contains a nonwhite pigment, resin particles, and water. The white pigment has cation responsiveness, and the absolute value of zeta potential of the white pigment is smaller than the absolute value of zeta potential of the nonwhite pigment.

According to an aspect of the present disclosure, an ink jet recording method is performed by using the ink jet ink composition set according to the aspect, the method includes adhering the white ink jet ink composition to a fabric by ejecting the white ink jet ink composition; and adhering the nonwhite ink jet ink composition to a region where the white ink jet ink composition has been adhered. The nonwhite ink jet ink composition is adhered without drying after the white ink jet ink composition is adhered.

DESCRIPTION OF EXEMPLARY EMBODIMENTS

Embodiments of the present disclosure are described below. The embodiments described below describe examples of the present disclosure. The present disclosure is not limited to the embodiments below and includes various embodiments carried out within a scope which does not change the gist of the present disclosure. All configurations described below are not necessarily configurations essential for the present disclosure.

1. Ink Jet Ink Composition Set

An ink jet ink composition set according to an embodiment of the present disclosure is a set of a white ink jet ink composition and a nonwhite ink jet ink composition. At least the white pigment contained in the white ink jet ink composition has cation responsiveness.

1. 1. Cation Responsiveness

The "cation responsiveness" represents one of the properties of a white pigment, a nonwhite pigment, or resin particles. The "cation responsiveness" represents that a particle dispersion state is changed by the action of cations when a dispersion of particles of one or more of the white pigment, the nonwhite pigment, and the resin particles comes in contact with cations. The cation responsiveness includes not only a case accompanied with chemical reaction between cations and dispersed particles, but also a case where a particle dispersion state is changed by interaction between ions and polar groups without accompanied by reaction.

The change in particle dispersion state by the action of cations is typically particle aggregation, and it can be said that high cation responsiveness indicates high aggregability of particles. The cation responsiveness can be evaluated as the ease of aggregation (aggregability) of particles. An example of the change in particle dispersion state by the action of cations is the occurrence of aggregation of particles due to a decrease in electrostatic repulsive force which is caused by electrical neutralization of negative charge with the cations introduced in a medium when particles are electrically repelled from each other due to the negative charge on particle surfaces and are dispersed without aggregation in the medium.

The cation responsiveness can be evaluated by using the white ink jet ink composition and the nonwhite ink jet ink composition and can also be evaluated by using a dispersion in which particles of the white pigment, the nonwhite pigment, or the resin particles are dispersed.

The cation responsiveness can be evaluated by, for example, mixing a particle dispersion with a test solution containing cations. The test solution is not particularly limited as long as it contains cations. An example of the test solution is a 5 mass % aqueous solution of magnesium sulfate heptahydrate. In addition, the mixing ratio of the particle dispersion to the test solution can be properly determined, but for example, they are mixed at such a ratio that the mass ratio of the solid content in the particle dispersion to the solid content of a cation-releasing compound in the test solution is 4:1 (particle solid solution: cation-releasing compound solid content).

Also, the cation responsiveness may be evaluated by visually observing the aggregation of a pigment or resin particles when being dropped on an aqueous solution of a polyvalent metal salt (calcium hydroxide, magnesium hydroxide, calcium nitrate, or the like). In a more quantitative sense, the volume-average particles diameter of particles may be measured and compared before and after mixing. In measuring the volume-average particle diameter, for example, the resultant mixture is slowly stirred at room temperature for 10 minutes and allowed to stand for 1 hour, diluted with pure water so that the total solid content is 0.01%, and then measured. The volume-average particle diameter (D50) is measured several times by using Nanotrac UPA-150 (manufactured by Nikkiso Co., Ltd.), and an average value is determined.

In addition, the volume-average particle diameter D50 of an ink or a particle dispersion before mixing can be measured by the same method as described below. For example, the volume-average particle diameter can be determined by measuring a dilution diluted with pure water so that the solid content of the dispersion before mixing is 0.01%.

Further, the cation responsiveness may be evaluated by an aggregation degree (%) which can be determined by the following formula.

Aggregation degree (%)={(D50 after mixing)−(D50 before mixing)}/(D50 before mixing)×100

1. 2. White Ink Jet Ink Composition

The white ink jet ink composition according to the embodiment contains a white pigment, resin particles, and water. The white pigment has the cation responsiveness. The white pigment has the cation responsiveness, and thus when the white ink jet ink composition is adhered to a recording medium, the white pigment is rapidly aggregated and sedimented, thereby enabling to form an image with excellent color development.

1. 2. 1 White Pigment

The white pigment contained in the white ink jet ink composition according to the embodiment has the cation responsiveness described above.

Examples of the white pigment include metal compounds such as metal oxides, barium sulfate, calcium carbonate, and the like. Examples of the metal oxides include titanium dioxide, zinc oxide, silica, alumina, magnesium oxide, and the like. In addition, particles having a hollow structure may be used as the white pigment, and known particles can be used as the particles having a hollow structure.

Among these, a typical example of the white pigment is titanium dioxide, and examples thereof include TIPAQUE CR-50-2, CR-57, CR-58-2, CR-60-2, CR-60-3, CR-Super-70, CR-90-2, CR-95, CR953, PC-3, PF-690, PF-691, PF-699, PF-711, PF-728, PF-736, PF-737, PF-739, PF-740, PF-742, R-980, and UT-771 (all manufactured by Ishihara Sangyo Kaisha, Ltd.), C. I. Pigment White 6, and the like.

When titanium dioxide is selected as the white pigment, the color development of a white image can be further enhanced. These white pigments may be used alone or in combination of two or more.

The volume-based average particle diameter (D50) (also referred to as the "volume-average particle diameter") of the white pigment is set to be larger than the volume-average particle diameter of inorganic fine particles described latter. The volume-average particle diameter of the white pigment is preferably 30.0 nm or more and 600.0 nm or less, more preferably 100.0 nm or more and 500.0 nm or less, and still more preferably 150.0 nm or more and 400.0 nm or less. When the volume-average particle diameter of the white pigment is within the range described above, the particles are hardly sedimented, and thus dispersion stability can be more improved. Also, the occurrence of clogging or the like of nozzles of an ink jet recording apparatus can be made difficult. In addition, the white pigment having the volume-average particle diameter within the range described above can more contribute to improvement in color development and visibility of the resultant image.

The volume-average particle diameter of the white pigment can be measured by a particle size distribution analyzer. An example of the particle size distribution analyzer is a particle size distribution analyzer (for example, "Nanotrac Series" manufactured by Microtrac Bel Inc.) using dynamic light scattering as a measurement principle. The volume-average particle diameter is referred as the "D50 value".

In the present specification, the term "white" in the description of the white ink jet ink composition, the white pigment, etc. represents not only complete white but also a color such as a chromatic color or achromatic color and a color with luster within a range where the colors are visible as white. Also, the term includes an ink and a pigment called and sold with names which suggest a white ink and white pigment.

In a quantitative sense, the "white" in a recorded matter includes not only a color in CIELAB with an L* of 100 but also a color with an L* of 60 or more and 100 or less and a* and b* of ±10 or less each.

The content (solid content) of the white pigment in the white ink jet ink composition relative to the total mass of the white ink jet ink composition is preferably 0.5% by mass or more and 20.0% by mass or less, more preferably 1.0% by mass or more and 20.0% by mass or less, still more preferably 3.0% by mass or more and 15.0% by mass or less, and even still more preferably 7.0% by mass or more and 13.0% by mass or less. When the content of the white pigment is within the range described above, an image having satisfactory visibility can be obtained.

The white pigment can be preferably stably dispersed in a dispersion medium, and a dispersant may be used for stable dispersion. Examples of the dispersant include a resin dispersant and the like, and a dispersant which can improve the dispersion stability of the white pigment in the white ink jet ink composition is selected. In addition, the white pigment may be used as a self-dispersing pigment produced by modifying the surfaces of pigment particles by oxidization or sulfonation with ozone, hypochlorous acid, fuming sulfuric acid, or the like. When the white pigment is a self-dispersing type, the cation responsiveness can be improved by modifying the surfaces of the white pigment so as to produce negative charge. Examples of a functional group which produces the negative charge include a carboxylate group, a sulfonate group, a phosphate group, and the like, and these groups can be introduced by properly selecting treatment.

Examples of the resin dispersant include water-soluble resins: (meth)acrylic resins and salts thereof, such as poly (meth)acrylic acid, (meth)acrylic acid-acrylnitrile copolymer, (meth)acrylic acid-(meth)acrylic acid ester copolymer, vinyl acetate-(meth)acrylic acid easter copolymer, vinyl acetate-(meth)acrylic acid copolymer, vinylnaphthalene-(meth)acrylic acid copolymer, and the like; styrene resins and salts thereof, such as styrene-(meth)acrylic acid copolymer, styrene-(meth)acrylic acid-(meth)acrylic acid ester copolymer, styrene-α-methylstyrene-(meth)acrylic acid copolymer, styrene-α-methylstyrene-(meth)acrylic acid-(meth)acrylic acid ester copolymer, styrene-maleic acid copolymer, styrene-maleic anhydride copolymer, and the like; urethane-based resins and salts thereof, which are polymer compounds (resins) each containing a urethane bond formed by reaction of an isocyanate group with a hydroxyl group and which may be linear and/or branched regardless of the presence of a crosslinked structure; poly-vinyl alcohols; vinylnaphthalene-maleic acid copolymer and salts thereof; vinyl acetate-maleic acid ester copolymer and salts thereof; and vinyl acetate-crotonic acid copolymer and salts thereof. Among these, preferred are a copolymer of a monomer having a hydrophobic functional group and a monomer having a hydrophilic functional group, and a polymer of a monomer having both a hydrophobic group and a hydrophilic group. A copolymer can be used in any one of the forms such as a random copolymer, a block copolymer, an alternate copolymer, and a graft copolymer.

Examples of a commercial product of the styrene-based resin dispersant include X-200, X-1, X-205, X-220, and X-228 (manufactured by Seiko PMC Corporation), Nopcosperse (registered trade name) 6100 and 6110 (manufactured by San Nopco Limited), JONCRYL 67, 586, 611, 678, 680, 682, and 819 (manufactured by BASF Corporation), DISPERBYK-190 (manufactured by BYK-Chemie Japan K. K.), N-EA137, N-EA157, N-EA167, N-EA177, N-EA197D, N-EA207D, and E-EN10 (manufactured by Dai-Ichi Kogyo Seiyaku Co., Ltd.), and the like.

Examples of a commercial product of the acrylic resin dispersant include BYK-187, BYK-190, BYK-191, BYK-194N, and BYK-199 (manufactured by BYK-Chemie Co., Ltd.), Aron A-210, A6114, AS-1100, AS-1800, A-30SL, A-7250, and CL-2 (manufactured by Toagosei Co., Ltd.), and the like.

Further, examples of a commercial product of the urethane-based resin dispersant include BYK-182, BYK-183, BYK-184, and BYK-185 (manufactured by BYK-Chemie Co., Ltd.), TEGO Disperse 710 (manufactured by Evonic Tego Chemi Corporation), Borchi (registered trade name) Gen 1350 (manufactured by OMG Borchers GmBH), and the like.

Examples of the commercial products are described above, but the dispersants may be obtained by synthesis.

The dispersants may be used alone or in combination of two or more. The total content of the dispersants relative to 50 parts by mass of the white pigment is preferably 0.1 parts by mass or more and 30 parts by mass or less, more preferably 0.5 parts by mass or more and 25 parts by mass or less, still more preferably 1 part by mass or more and 20 parts by mass or less, and even still more preferably 1.5 parts by mass or more and 15 parts by mass or less. When the content of the dispersant is 0.1 parts by mass or more relative to 50 parts by mass of the white pigment, the dispersion stability of the white pigment can be further enhanced. Also, When the content of the dispersant is 30 parts by mass or less relative to 50 parts by mass of the white pigment, the viscosity of the resultant dispersion can be suppressed.

The dispersants may be used alone or in combination of two or more, but the cation responsiveness can be improved by selecting the dispersants so that at least one or more dispersants contain an acid group such as a carboxylate group, a sulfonate group, a phosphate group, or the like.

The weight-average molecular weight of the dispersant is more preferably 500 or more. By using such a resin dispersant as the dispersant, the odor can be further decreased, and the dispersion stability of the white pigment can be further improved. When the dispersant is used, the white pigment serving as mother particles may be surface-treated or not.

1. 2. 2. Resin Particles

The white ink jet ink composition contains the resin particles. The resin particles can further improve the adhesion of an image, formed by the white ink jet ink composition adhered to a recording medium. Examples of the resin particles include resin particles composed of a urethane-based resin, an acrylic resin (includes a styrene acrylic resin), a fluorene-based resin, a polyolefin-based resin, a rosin-modified resin, a terpene-based resin, a polyester resin, a polyamide resin, an epoxy resin, a vinyl chloride resin, vinyl chloride-vinyl acetate copolymer, an ethylene-vinyl acetate resin, and the like. Among these, a urethane-based resin, an acrylic resin, a polyolefin resin, and a polyester resin are preferred. These resin particles are frequently handled in an emulsion form, but may be supplied in a powder form. These types of resin particles can be used alone or in combination of two or more.

The urethane-based resin is a general term of resins having a urethane bond. The urethane-based resin used may be a polyether-type urethane resin containing an ether bond other than a urethane bond in its main chain, a polyester-type urethane resin containing an ester bond in its main chain, a polycarbonate-type urethane resin containing a carbonate bond in its main chain, or the like. In addition, a commercial product may be used as the urethane-based resin, and examples a commercial product which may be used include Superflex 460, 460s, 840, and E-4000 (trade name, manufactured by Dai-Ichi Kogyo Seiyaku Co., Ltd.), Resamine D-1060, D-2020, D-4080, D-4200, D-6300, and D-6455 (trade name, manufactured by Dainichi Seika Kogyo Co., Ltd.), Takelac WS-6021 and W-512-A-6 (trade name, manufactured by Mitsui Chemicals Polyurethane Co., Ltd.), Sancure 2710 (trade made, manufactured by LUBRIZOL Corporation), Permarin UA-150 (trade name, manufactured by Sanyo Chemical Industries, Ltd.), and the like.

The acrylic resin is a general term of polymers produced by polymerizing at least an acrylic monomer, such as (meth)acrylic acid, (meth)acrylic acid ester, or the like, as one component. Examples thereof include a resin produced by an acrylic monomer, a copolymer produced by an acrylic monomer and a monomer other than this, and the like. For example, an acrylic-vinyl resin which is a copolymer of an acrylic monomer and a vinyl monomer, may be used. Examples of the vinyl monomer include styrene and the like.

Usable examples of the acrylic monomer include acrylamide, acrylonitrile, and the like. A commercial product of a resin emulsion produced by using the acrylic resin as a raw material may be used. For example, the commercial product used may be selected from the followings: FK-854 (trade name, manufactured by Chuo Rika Kogyo Corporation), Movinyl 952B and 718A (trade name, manufactured by Nippon Synthetic Chemical Industry Co., Ltd.), Nipol LX852 and LX874 (trade name, manufactured by Zeon Corporation), and the like.

In the present specification, the acrylic resin may be a styrene-acrylic resin described latter. In addition, in the present specification, the term "(meth)acrylic" represents at least one of "acrylic" and "methacrylic".

The styrene-acrylic resin is a copolymer produced from a styrene monomer and a (meth)acrylic monomer, and examples thereof include styrene-acrylic acid copolymer styrene-methacrylic acid copolymer, styrene-methacrylic acid-acrylic acid ester copolymer, styrene-α-methylstyrene-acrylic acid copolymer, styrene-α-methylstyrene-acrylic acid-acrylic acid ester copolymer, and the like. A commercial product may be used as the styrene-acrylic resin, and examples of a commercial product which may be used include Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade name, manufactured by BASF Corporation), Movinyl 966A and 975N (trade name, manufactured by Nippon Synthetic Chemical Industry Co., Ltd.), Vinyblan 2586 (manufactured by Nissin Chemical Industry Co., Ltd.), and the like.

The polyolefin-based resin has a structural skeleton containing an olefin, such as ethylene, propylene, butylene, or the like, and a well-known resin can be properly selected and used. A commercial product can be used as the olefin resin, and for example, Arrowbase CB-1200 and CD-1200 (trade name, manufactured by Unitika, Ltd.), or the like may be used.

Examples of commercial products are described above, but the resin particles may be obtained by synthesis.

The volume-average particle diameter of the resin particles is preferably 10 nm or more and 300 nm or less, more preferably 30 nm or more and 300 nm or less, still more preferably 30 nm or more and 250 nm or less, and even still more preferably 40 nm or more and 220 nm or less. The volume-average particle diameter can be measured by the method described above.

When the white ink jet ink composition contains the resin particles, the content of the resin particles is 0.1% by mass or more and 20% by mass or less, preferably 1% by mass or more and 15% by mass or less, and more preferably 2% by mass or more and 10% by mass or less in terms of solid content relative to the total mass of the white ink jet ink composition.

The resin particles may have the cation responsiveness. The cation responsiveness can be exhibited by placing a group having negative charge on the surfaces of the resin particles. Examples of a commercial product of the resin particles having the cation responsiveness include Takelac WS-6021, Movinyl 966A (trade name, an acrylic resin emulsion manufactured by Nippon Synthetic Chemical Industry Co., Ltd.), Microgel E-1002 and Microgel E-5002 (trade name, manufactured by Nippon Paint Co., Ltd.), Voncoat 4001 and Voncoat 5454 (trade name, manufactured by DIC Corporation), SAE 1014 (trade name, manufactured by Zeon Corporation), Saivinol SK-200 (trade name, manufactured by SAIDEN CHEMICAL INDUSTRY CO., LTD.), Joncryl 7100, Joncryl 390, Joncryl 711, Joncryl 511, Joncryl 7001, Joncryl 632, Joncryl 741, Joncryl 450, Joncryl 840, Joncryl 74J, Joncryl HRC-1645J, Joncryl 734, Joncryl 852, Joncryl 7600, Joncryl 775, Joncryl 537J, Joncryl 1535, Joncryl PDX-7630A, Joncryl 352J, Joncryl 352D, Joncryl PDX-7145, Joncryl 538J, Joncryl 7640, Joncryl 7641, Joncryl 631, Joncryl 790, Joncryl 780, and Joncryl 7610 (trade name, manufactured by BASF Corporation), and NK Binder R-5HN (trade name manufactured by Shin-Nakamura Chemical Co., Ltd., acrylic resin emulsion, solid content: 44%). When the resin particles have the cation responsiveness, the aggregability of components of the white ink jet ink composition is further enhanced, and thus an image with better color development can be obtained.

1. 2. 3. Water

The white ink jet ink composition according to the embodiment contains water. The white ink jet ink composition is a water-based ink. The "water-based" represents a composition containing water as one of the main solvent components. For example, this can decrease the environmental load and allows recording with little odor or the like.

Water is a component evaporated and scattered by drying. The water is preferably pure water such as ion exchanger water, ultrafiltered water, reverse osmosis water, distilled water, or the like, or ultrapure water from which ionic impurities are removed as much as possible. In addition, when water sterilized by ultraviolet irradiation, hydrogen peroxide addition, or the like is used, the occurrence of mildew or bacteria can be preferably suppressed when an ink is stored for a long time. The content of water relative to the total amount of the white ink jet ink composition is preferably 45% by mass or more, more preferably 50% by mass or more and 98% by mass or less, and still more preferably 55% by mass or more and 95% by mass or less.

1. 2. 4. Other Components

The white ink jet ink composition may contain, besides the white pigment, the resin particles, and water, an organic solvent, a surfactant, wax, an additive, an antiseptic/antifungal agent, an anti-rust agent, a chelating agent, a viscosity modifier, an antioxidant, an anti-mold agent, and the like. These are described in order below.

(Organic Solvent)

The white ink jet ink composition used in a recording method according to an embodiment of the present disclosure may contain an organic solvent. The organic solvent preferably has water solubility. The functions of the organic solvent include improving the wettability of the white ink jet ink composition to a recording medium and enhancing the water-retaining property of the white ink jet ink composition. The organic solvent can also function as a penetrant.

Examples of the organic solvent include esters, alkylene glycol ethers, cyclic esters, nitrogen-containing solvents, polyhydric alcohols, and the like. Examples of the nitrogen-containing solvents include cyclic amides, noncyclic amides, and the like. Examples of noncyclic amides include alkoxy alkyl amides and the like.

Examples of the esters include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, methoxybutyl acetate, and the like; and glycol diesters such as ethylene glycol diacetate, diethylene glycol diacetate, propylene glycol diacetate, dipropylene glycol diacetate, ethylene glycol acetate propionate, ethylene glycol acetate butylate, diethylene glycol acetate butylate, diethylene glycol acetate propionate, diethylene glycol acetate butylate, propylene glycol acetate propionate, propylene glycol acetate butylate, dipropylene glycol acetate butylate, dipropylene glycol acetate propionate, and the like.

The alkylene glycol ethers may be alkylene glycol monoethers or diethers, and alkyl ethers are preferred. Examples thereof include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monobutyl ether, and the like; and alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol bibutyl ether, diethylene glycol methylethyl ether, diethylene glycol methylbutyl ether, triethylene glycol dimethyl ether, triethylene glycol diethyl ether, triethylene glycol dibutyl ether, triethylene glycol methylbutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, tripropylene glycol dimethyl ether, and the like.

The alkylene glycol diethers are more preferred than monoethers in view of the tendency to easily dissolve or swell the resin particles in an ink and improvement in abrasion resistance of the formed image.

Examples of the cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, ε-decanolactone, and the like; and compounds each having an alkyl group which has 1 to 4 carbon atoms and is substituted for a hydrogen of a methylene group adjacent to a carbonyl group of any one of these lactones.

Examples of the alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, 3-tert-butoxy-N,N-methylethylpropionamide, and the like.

Examples of the cyclic amides include lactams such as pyrrolidones, such as 2-pyrrolidone, 1-methyl-2-pyrrolidone, 1-ethyl-2-pyrrolidone, 1-propyl-2-pyrrolidone, 1-butyl-2-pyrrolidone, and the like. These are preferred in view of promoting the solubility of a cationic compound and the film formation of resin particles described later, and 2-pyrrolidone is more preferred.

Compounds represented by general formula (1) below are also preferably used as the alkoxyalkylamides.

$$R^1\text{—O—}CH_2CH_2\text{—}(C=O)\text{—}NR^2R^3 \quad (1)$$

In the formula (1), $R^1$ represents an alkyl group having 1 or more and 4 or less carbon atoms, and $R^2$ and $R^3$ each independently represent a methyl group or an ethyl group. The "alkyl group having 1 or more and 4 or less carbon atoms" may be a linear or branched alkyl group, and examples thereof include a methyl group, an ethyl group, a n-propyl group, an iso-propyl group, a n-butyl group, a sec-butyl group, an iso-butyl group, and a tert-butyl group. The compounds represented by the formula (1) may be used alone or in combination or two or more.

The function of the compounds represented by the formula (1) is, for example, to enhance the surface drying properties and fixability of the white ink jet ink composition adhered to a low-absorbable recording medium. In particular, the compounds represented by the formula (1) have the excellent function of properly softening/dissolving a vinyl chloride resin. Therefore, the compounds represented by the formula (1) can soften/dissolve a recorded surface containing a vinyl chloride resin and thus can allow the white ink jet ink composition to permeate into a low-absorbable recording medium. When the white ink jet ink composition permeates into a low-absorbable recording medium, the white ink jet ink composition is strongly fixed, and the surface of the white ink jet ink composition is easily dried. Therefore, the resultant image is excellent in surface drying properties and fixability.

Also, in the formula (1), $R^1$ is more preferably a methyl group having 1 carbon atom. The standard boiling point of a compound having a methyl group as $R^1$ in the formula (1) is lower than the standard boiling point of a compound having, as $R^1$, an alkyl group having 2 or more and 4 or less carbon atoms. Therefore, when a compound having a methyl group as $R^1$ in the formula (1) is used, the surface drying properties (particularly, the surface drying properties of an image when recorded in a high-temperature high-humidity environment) of an adhesion region may be further improved.

When a compound represented by the formula (1) is used, the content thereof relative to the total mass of the white ink jet ink composition is not particularly limited, but is about 5% by mass or more and 50% by mass or less and preferably 8% by mass or more and 48% by mass or less. When the content of the compound represented by the formula (1) is within the range described above, the fixability and surface drying properties (particularly, the surface drying properties of an image when recorded in a high-temperature high-humidity environment) of an image may be further improved.

Examples of the polyhydric alcohols include 1,2-alkanediols (for example, alkanediols such as ethylene glycol, propylene glycol (another name: propane-1,2-diol), 1,2-butanediol, 1,2-pentanediol, 1,2-hexanediol, 1,2-heptanediol, 1,2-octanediol, and the like), polyhydric alcohols (polyols), excluding 1,2-alkanediols, (for example, diethylene glycol, dipropylene glycol, triethylene glycol, 1,3-propanediol, 1,3-butanediol (another name: 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, glycerin, and the like); and the like.

The polyhydric alcohols can be divided into alkanediols and polyols. The alkanediols are diols of alkanes having 5 or more carbon atoms. The number of carbon atoms of alkane is preferably 5 to 15, more preferably 6 to 10, and still more preferably 6 to 8. Among these, 1,2-alkanedils are preferred.

The polyols are polyols of alkanes having 4 or less carbon atoms or intermolecular condensates between hydroxyl groups of polyols of alkanes having 4 or less carbon atoms. The number of carbon atoms of an alkane is preferably 2 to 3. The number of hydroxyl groups in a polyol molecule is 2 or more, preferably 5 or less, and more preferably 3 or less. When the polyols are the intermolecular condensates, the number of molecular condensations is 2 or more, preferably 4 or less, and more preferably 3 or less. The polyhydric alcohols can be used alone or as a mixture of two or more.

The alkanediols and polyols can function as a permeation solvent and/or a moisturizing solvent. However, the alkanediols tend to have the strong property as the permeation solvent, and the polyols tend to have the strong property as the moisturizing solvent.

When the white ink jet ink composition contains an organic solvent, organic solvents may be used alone or in combination of two or more. The total content of the organic solvents relative to the total mass of the white ink jet ink composition is, for example, 5% by mass or more and 50% by mass or less, preferably 10% by mass or more and 45% by mass or less, more preferably 15% by mass or more and 40% by mass or less, and still more preferably 20% by mass or more and 40% by mass or less. When the content of the organic solvents is within the range described above, a balance between the wetting extendability and drying properties is further improved, and an image with higher image quality can be easily formed.

Surfactant

The white ink jet ink composition may contain a surfactant. The surfactant functions to improve wettability of a recording medium by decreasing the surface tension of the white ink jet ink composition. Among the surfactants, for example, an acetylene glycol-based surfactant, a silicone-based surfactant, and a fluorine-based surfactant are preferably used.

Examples of the acetylene glycol-based surfactant include, but are not particularly limited to, Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all the trade names, manufactured by Air Products & Chemicals, Inc.), Ofline B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all the trade names, manufactured by Nissin Chemical Industry Co., Ltd.), and Acetynol E00, E00P, E40, and E100 (all the trade names, manufactured by Kawaken Fine Chemical Co., Ltd.).

The silicone-based surfactant is not particularly limited, but is, for example, a polysiloxane-based compound. The polysiloxane-based compound is not particularly limited, but is preferably, for example, polyether-modified organosiloxane. Examples of a commercial product of the polyether-modified organosiloxane include BYK-306, BYK-307, BYK-333, BYK-341, BYK-345, BYK-346, and BYK-348 (the trade names, manufactured by BYK Chemie Japan K. K.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (the trade names, manufactured by Shin-Etsu Chemical Co., Ltd.), Silface SAG002, 005, 503A, and 008 (the trade names, manufactured by Shin-Etsu Chemical Co., Ltd.), and the like.

A fluorine-modified polymer is preferably used as the fluorine-based surfactant, and examples thereof include BYK-3440 (manufactured by BYK Chemie Japan K. K.), Surflon S-241, S-242, and S-243 (the trade names, manufactured by AGC Seimi Chemical Co., Ltd.), Ftergent 215M (manufactured by Neos Co., Ltd.), and the like.

When the white ink jet ink composition contains the surfactant, plural types may be contained. When the white ink jet ink composition contains the surfactant, the content relative to the total mass of the white ink jet ink composition is 0.1% by mass or more and 2% by mass or less, preferably 0.4% by mass or more and 1.5% by mass or less, and more preferably 0.5% by mass or more and 1.0% by mass or less.

Wax

The white ink jet ink composition may contain wax. The wax has the function of imparting lubrication to an image formed by the white ink jet ink composition, and thus peeling or the like of an image formed by the white ink jet ink composition can be decreased.

Examples of a component constituting the wax include plant/animal-based waxes such as carnauba wax, candelilla wax, beeswax, rice bran wax, lanolin, and the like; petroleum waxes such as paraffin wax, microcrystalline wax, polyethylene wax, oxidized polyethylene wax, petrolatum, and the like; mineral waxes such as montan wax, ozokerite and the like; synthetic waxes such as carbon wax, Hoeschst wax, polyolefin wax, steric acid amide, and the like; natural/synthetic wax emulsions and compounded waxes such as α-olefin-maleic anhydride copolymer and the like. These can be used alone or as a mixture of plural types. Among these, from the viewpoint of the more excellent effect of enhancing the fixability to a soft package film described later, polyolefin wax (particularly, polyethylene wax and polypropylene wax) and paraffin wax are preferably used.

A commercial product can be directly used as the wax, and examples thereof include Nopcoat PEM-17 (the trade name, manufactured by San Nopco, Ltd.), Chemipearl W4005 (the trade name, manufactured by Mitsui Chemical, Inc.), AQUACER 515, 539, and 593 (trade name, manufactured by BYK Chemie Japan K. K.), and the like.

The wax may be supplied in the form of an emulsion or a suspension. The content of the wax in terms of solid content relative to the total mass of the white ink jet ink composition is preferably 0.1% by mass or more and 10% by mass or less, more preferably 0.5% by mass or more and 5% by mass or less, and still more preferably 0.5% by mass or more and 2% by mass or less. With the wax content within the range described above, the function of the wax can be satisfactorily exhibited. When one or both of the white ink jet ink composition and the nonwhite ink jet ink composition contain the wax, the function of imparting lubrication to an image can be satisfactorily obtained.

(Additive)

The white ink jet ink composition may contain ureas, amines, saccharides, or the like as additives. Examples of ureas include urea, ethyleneurea, tetramethylurea, thiourea, 1,3-dimethyl-2-imidazolidinone, and the like; betaines (trimethylglycine, triethylglycine, tripropylglycine, triisopropylglycine, N,N,N-trimethylalanine, N,N,N-triethylalanine, N,N,N-triisopropylalanine, N,N,N-trimethylmethylalanine, carnitine, acetylcarnitine, and the like); and the like.

Examples of amines include diethanolamine, triethanolamine, triisopropanolamine, and the like. The ureas and amines may be allowed to function as a pH adjuster.

Examples of saccharides include glucose, mannose, fructose, ribose, xylose, arabinose, galactose, aldonic acid, glucitol (sorbit), maltose, cellobiose, lactose, sucrose, trehalose, maltotriose, and the like.

Others

If required, the white ink jet ink composition used in a recording method according to an embodiment of the present disclosure may further contain components such as an antiseptic/antifungal agent, an anti-rust agent, a chelating agent, a viscosity modifier, an antioxidant, an anti-mold agent, and the like.

1. 2. 5. Physical Properties and Production of White Ink Jet Ink Composition

The viscosity of the white ink jet ink composition at 20° C. is preferably 1.5 mPa·s or more and 15 mPa·s or less, more preferably 1.5 mPa·s or more and 7 mPa·s or less, and still more preferably 1.5 mPa·s or more and 5.5 mPa·s or less.

From the viewpoint of achieving proper wetting extendability to a recording medium, the upper limit of surface tension at 25° C. of the white ink jet ink composition is 40 mN/m or less, preferably 38 mN/m or less, more preferably 35 mN/m or less, and still more preferably 30 mN/m or less. From the same viewpoint, the lower limit of the surface tension is 15 mN/m or more and preferably 20 mN/m or more. The surface tension can be measured by confirming the surface tension when a platinum plate is wetted with the composition in an environment of 25° C. using automatic surface tensiometer CBVP-Z (manufactured by Kyowa Interface Science Co., Ltd.

When the surface tension of the white ink jet ink composition is within the range described above, ejection stability and initial filling properties during ink jet recording can be more improved.

1. 3. Nonwhite Ink Jet Ink Composition

The nonwhite ink jet ink composition contains a nonwhite pigment, resin particles, and water.

1. 3. 1. Nonwhite Pigment

The nonwhite ink jet ink composition contains the nonwhite pigment. The nonwhite pigment contained in the nonwhite ink jet ink composition is a coloring material other than the white color material described above. The nonwhite pigment is preferably, for example, a color material of cyan, yellow, magenta, black, or the like.

The nonwhite pigment preferably has excellent light resistance, weather resistance, gas resistance, etc., and from this viewpoint, an organic pigment is preferred.

Usable examples of the pigment include azo pigments such as an insoluble azo pigment, a condensed azo pigment, an azo lake, a lake azo pigment, and the like; polycyclic pigments such as a phthalocyanine pigment, perylene and perinone pigments, an anthraquinone pigment, a quinacridone pigment, a dioxane pigment, a thioindigo pigment, an isoindolinone pigment, a quinophthalone pigment, and the like; a dye chelate; a dyeing lake; a nitro pigment; a nitroso pigment; aniline black; a daylight fluorescent pigment; carbon black; and the like. These pigments can be used alone or in combination of two or more. Further, a photoluminescent pigment may be used as the nonwhite pigment.

Examples of the pigments include, but are not limited to, the following pigments.

Examples of a black pigment include No. 2300, No. 900, MCF88, No. 33, No. 40, No. 45, No. 52, MA7, MA8, MA100, No. 2200B, and the like (above manufactured by Mitsubishi Chemical Corporation, Raven 5750, Raven 5250, Raven 5000, Raven 3500, Raven 1255, Raven 700, and the like (above manufactured by Carbon Columbia Corporation), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (manufactured by CABOT JAPAN K. K.), and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4, and the like (above manufactured by Degussa Corporation).

In the embodiment, in view of high color development, the nonwhite pigment is preferably a black self-dispersing pigment as a self-dispersing pigment, produced by surface treatment of oxidization with hypohalous acid and/or hypohalous acid salt, oxidization with ozone, or oxidization with persulfuric acid and/or persulfate. A commercial product can also be used as the self-dispersing pigment in a black ink composition, and a preferred example thereof is Microjet CW1 (manufactured by Orient Chemical Industries Co., Ltd.) or the like.

Examples of a yellow pigment include C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of a magenta pigment include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C. I. Pigment Violet 19, 23, 32, 33, 36, 38, 43, and 50.

Examples of a cyan pigment include C. I. Pigment Blue 1, 2, 3, 15, 15:1, 15:2, 15:3, 15:34, 15:4, 16, 18, 22, 25, 60, 65, and 66, and C. I. Bat Blue 4 and 60.

Examples of a pigment other than magenta, cyan, and yellow pigments include, but are not particularly limited to, C. I. Pigment Green 7 and 10, C. I. Pigment Brown 3, 5, 25, and 26, and C. I. Pigment Orange 1, 2, 5, 7, 13, 14, 15, 16, 24, 34, 36, 38, 40, 43, and 63.

Examples of a pearl pigment include, but are not particularly limited to, pigments with pearly luster or interference luster, such as titanium oxide coated mica, fish scales, bismuth oxychloride, and the like.

Examples of a metallic pigment include, but are not particularly limited to, particles composed of simples or alloys of aluminum, silver, gold, platinum, nickel, chromium, tin, zinc, indium, titanium, copper, and the like.

The nonwhite pigment is preferably dispersible or soluble in a dispersion medium, and if required, a dispersant may be used for dispersion. The same dispersant as the dispersant used for improving the dispersibility of a white color material of the white ink jet ink composition can be used.

The content of the nonwhite pigment relative to the total mass of the nonwhite ink jet ink composition is preferably 0.3% by mass or more and 20% by mass or less, more preferably 0.5% by mass or more and 15% by mass or less, still more preferably 1% by mass or more and 10% by mass or less, and even still more preferably 2% by mass or more and 7% by mass or less.

The volume-average particle diameter of the nonwhite pigment is preferably 10 nm or more and 300 nm or less, more preferably 30 nm or more and 250 nm or less, still more preferably 50 nm or more and 250 nm or less, particularly preferably 70 nm or more and 200 nm or less, and further preferably 80 nm to 150 nm. The volume-average particle diameter of the nonwhite pigment is measured as an initial state by the method for confirming the volume-average particle diameter described above. The volume-average particle diameter within the range described above is preferred in view of easy availability of a desired color material and the ease of achievement of desired characteristics of a color material.

1. 3. 2. Other Components

The nonwhite ink jet ink composition contains the resin particles and water. The resin particle and water are the same as described above for the white ink jet ink composition, and thus detailed description is omitted.

The nonwhite ink jet ink composition may contain, besides the nonwhite pigment, the resin particles, and water, components such as an organic solvent, a surfactant, wax, an additive, an antiseptic/antifungal agent, an anti-rust agent, a chelating agent, a viscosity modifier, an antioxidant, an anti-mold agent, etc. These components are also the same as described above for the white ink jet ink composition, and thus detailed description is omitted.

1. 3. 3. Cation Responsiveness of Each Component

One or two or more of the nonwhite pigment and the resin particles in the nonwhite ink jet ink composition may have cation responsiveness. When the nonwhite pigment and the resin particles in the nonwhite ink jet ink composition are selected as described above, the color development of a nonwhite image can be improved. For example, even when only the resin particles in the nonwhite ink jet ink composition are selected to have cation responsiveness, mixing with the white ink jet ink composition can be suppressed by aggregation of the resin particles, and thus the color development of a nonwhite image can be more improved.

Further, when at least the nonwhite pigment of the nonwhite pigment and the resin particles in the nonwhite ink jet ink composition is selected to have cation responsiveness, the color development of a nonwhite image can be further improved. Thus, mixing with the white ink jet ink composition can be suppressed by aggregation of the nonwhite pigment, and thus the color development of a nonwhite image can be more improved.

1. 3. 4. Physical Properties and Production of Nonwhite Ink Jet Ink Composition The viscosity of the nonwhite ink jet ink composition at 20° C. is preferably 1.5 mPa·s or more and 15 mPa·s or less, more preferably 1.5 mPa·s or more and 7 mPa·s or less, and still more preferably 1.5 mPa·s or more and 5.5 mPa·s or less.

From the viewpoint of achieving proper wetting extendability to a recording medium, the upper limit of surface tension at 25° C. of the nonwhite ink jet ink composition is 40 mN/m or less, preferably 38 mN/m or less, more preferably 35 mN/m or less, and still more preferably 30 mN/m or less. From the same viewpoint, the lower limit of the surface tension is 15 mN/m or more and preferably 20 mN/m or more. The surface tension is measured as described above.

When the surface tension of the nonwhite ink jet ink composition is within the range described above, ejection stability and initial filling properties during ink jet recording can be more improved.

1. 4. Relation of Zeta Potential

In an ink set according to an embodiment of the present disclosure, the absolute value of zeta potential of the white pigment contained in the white ink jet ink composition is designed to be lower than the absolute value of zeta potential of the nonwhite pigment contained in the nonwhite ink jet ink composition contained in the nonwhite ink jet ink composition.

When the white pigment contained in the white ink jet ink composition is aggregated and sedimented due to the cation responsiveness and when the white pigment having a low sedimentation rate remains in a supernatant of the white ink jet ink composition, the landing of the nonwhite ink jet ink composition causes the competition of sedimentation between the floating white pigment and the nonwhite pigment supplied. When the absolute value of zeta potential of the white pigment is lower than the absolute value of zeta potential of the nonwhite pigment, the sedimentation rate of the floating white pigment is relatively higher than the sedimentation rate of the nonwhite pigment, and thus mixing of both is made more difficult. This can improve the color development of the white pigment and/or the color development of the nonwhite pigment.

1. 5. Other Physical Properties

The specific gravity of the white pigment contained in the white ink jet ink composition is preferably higher than the specific gravity of the nonwhite pigment contained in the nonwhite ink jet ink composition. When the specific gravity of the white pigment is higher than the specific gravity of the nonwhite pigment, the sedimentation rate of the white pigment is relatively higher than the sedimentation rate of the nonwhite pigment. Thus, when the white ink jet ink composition lands on a recording medium, the white pigment is more rapidly sedimented. Therefore, when the nonwhite ink jet ink composition lands on the recording medium, mixing of the white pigment and the nonwhite pigment more hardly occurs. This can improve the color development of the white pigment and/or the color development of the nonwhite pigment.

1. 6. Application and Recording Medium

The ink jet ink composition set of the embodiment can be used for various media, but when applied to fabrics among the recording media, a more remarkable effect can be obtained. When a fabric is treated with a cationic compound, an image having particularly excellent color development can be formed. That is, the ink jet ink composition set of the embodiment enables easy textile printing of an image with good color development on a fabric.

Herein, examples of the recording medium and cationic compound are described.

Recording Medium

The recording medium to which the ink jet ink composition set of the embodiment is applied is not particularly limited and may be one having a liquid-absorbing recording surface or one not having a liquid-absorbing recording surface. Therefore, usable examples of the recording media include, but are not particularly limited to, paper, a film, a cloth, a metal, glass, a polymer, and the like. When the recording medium has a liquid-absorbing recording surface, the pigment easily permeates into the recording medium, but the configuration of the present disclosure is preferred because the color development can be improved. In particular, when an image is recorded on a fabric, the effect of improving the color development becomes more remarkable.

The fabric is not particularly limited. Examples of a material constituting the fabric include, but are not particularly limited to, natural fibers such as cotton, hemp, wool, silk, and the like, synthetic fibers such as polypropylene, polyester, acetate, triacetate, polyamide, polyurethane, and the like, and biodegradable fibers such as polylactic acid and the like. Also, mixed spun fibers of these fibers may be used.

The forms of fabrics may be any one of a woven fabric, a knit, a non-woven fabric, and the like of the fibers, or a mixture may be used.

Cationic Compound

The cationic compound is a compound releasing a cation or having a cation. The cationic compound has the function of aggregating a component such as the pigment, the resin particles, etc. However, the degree of aggregation of the pigment and the resin particles by the cationic compound depends on the type of each of the cationic compounds, the pigment and the resin particles and can be adjusted according to the type. The aggregation can, for example, enhance for example, the color development, fixability of the resin particles, and/or the ink viscosity.

Examples of the cationic compound include, but are not particularly limited to, a metal salt, a cationic organic compound, and the like. Examples of the cationic organic compound include a cationic polymer, a cationic surfactant, and the like. The metal salt is preferably a polyvalent metal salt, and the cationic organic compound is preferably a cationic polymer. Also, an organic acid may be used in view of proton release.

The metal salt is preferably a polyvalent metal salt, but a metal salt other than the polyvalent metal salt can be used. Among these cationic compounds, in view of easily producing the cation responsiveness of the pigment and the resin particles, at least one metal salt is preferably used, and the cationic compounds can also be used in combination of plural types.

The polyvalent metal salt is a compound composed of divalent or higher-valent metal ion and anion. Examples of a divalent or higher-valent metal ion include ions of calcium, magnesium, copper, nickel, zinc, barium, aluminum, titanium, strontium, chromium, cobalt, iron, and the like. Among the metal ions constituting the polyvalent metal salt, in view of excellent aggregability of ink components, at least one of calcium ion and magnesium ion is preferred.

The anion constituting the polyvalent metal salt is inorganic ion or organic ion. That is, in the present disclosure, the polyvalent metal salt is composed of an inorganic ion or organic ion and a polyvalent metal. Examples of the inorganic ion include a chlorine ion, a bromine ion, an iodine ion, a nitrate ion, a sulfurate ion, a hydroxide ion, and the like. The organic ion is, for example, an organic acid ion, for example, a carboxylate ion.

Examples of the polyvalent metal salt include calcium carbonate such as heavy calcium carbonate and light calcium carbonate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium acetate, magnesium acetate, aluminum acetate, and the like. These polyvalent metal salts may be used alone or in combination of two or more. Among these, because sufficient solubility in water can be secured and a treatment solution mark is decreased (a mark becomes unremarkable), at least any one of magnesium sulfate, calcium nitrate, and calcium chloride is preferred, and calcium nitrate is more preferred. The metal salt may contain hydrate water in the form of a raw material.

The metal salt other than the polyvalent metal salt is, for example, a monovalent metal salt such as a sodium salt, a calcium salt, or the like, and examples thereof include sodium sulfate, potassium sulfate, and the like.

Preferred examples of the organic acid include poly(meth) acrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, and derivatives or salts of these compounds, and the like. These organic acids may be used alone or in combination of two or more. In addition, organic acid salts as metal salts are included in the metal salts described above.

Preferred examples of an inorganic acid include sulfuric acid, hydrochloric acid, nitric acid, phosphoric acid, and salts thereof, and the like. These inorganic acids may be used alone or in combination of two or more. In addition, inorganic acid salts as metal salts are included in the metal salts described above.

Example of a cation polymer (cationic polymer) include a cationic urethane-based resin, a cationic olefin-based resin, a cationic amine-based resin, and the like. The cationic polymer is preferably water-soluble.

A commercial product can be used as the cationic urethane-based resin, and examples thereof include Hydran CP-7010, CP-7020, CP-7030, CP-7040, CP-7050, CP-7060, and CP-7610 (trade name, manufactured by DIC Corporation), Superflex 600, 610, 620, 630, 640, and 650 (trade name, manufactured by Daiichi Kogyo Seiyaku Co., Ltd.), Urethane emulsion WBR-2120C and WBR-2122C (trade name, manufactured by Taisei Fine Chemical Co., Ltd.), and the like.

The cationic olefin-based resin has an olefin, such as ethylene, propylene, or the like, in its structural skeleton, and a known resin can be properly selected and used. In addition, the cationic olefin-based resin may be in an emulsion state produced by dispersing in a solvent including water, an organic solvent, and the like. A commercial product can be used as the cationic olefin-based resin, and usable examples thereof include Arrowbase CB-1200 and CD-1200 (trade name, manufactured by Unitika, Ltd.), and the like.

The cationic amine-based resin may be one having an amino group in its structure, and a known resin can be properly selected and used. Examples thereof include a polyamine resin, a polyamide resin, a polyallylamine resin, and the like. The polyamine resin is a resin having an amino group in its main skeleton. The polyamide resin is a resin having an amide group in its main skeleton. The polyallylamine resin is a resin having a structure derived from an allyl group in its main skeleton.

Examples of the cationic polyamine-based resin include Unisense KHE103L manufactured by Senka Corporation (hexamethylenediamine/epichlorohydrin resin, 1% aqueous solution pH of about 5.0, viscosity: 20 to 50 (mPa·s), an aqueous solution with a solid content concentration of 50% by mass), Unisense KHE104L (dimethylamine/epichlorohydrin resin, 1% aqueous solution pH of about 7.0, viscosity: 1 to 10 (mPa·s), an aqueous solution with a solid content concentration of 20% by mass), and the like. Examples of a commercial product of the cationic polyamine-based resin include FL-14 (manufactured by SNF, Inc.), Arafix 100, 2515, 255, and 255LOX (manufactured by Arakawa Chemical Industries, Ltd.), DK-6810, 6853, 6885; WS-4010, 4011, 4020, 4024, 4027, and 4030 (manufactured by Seiko PMC Corporation), Papiogen P-105 (manufactured by Senka Corporation), Sumirez Resin 650(30), 675A, 6615, and SLX-1 (manufactured by Taoka Chemical Co., Ltd.), Catiomaster (registered trade name) PD-1, 7, 30, A, PDT-2, PE-10, PE-30, DT-EH, EPA-SK01, and TMHMDA-E (manufactured by Yokkaichi Chemical Co., Ltd.), and Jetfix 36N, 38A, 5052 (manufactured by Satoda Chemical Industrial Co., Ltd.).

Examples of the polyallyamine resin include polyallylamine hydrochloride, polyallylamine amide sulfate, allylamine hydrochloride-diallylamine hydrochloride copolymer, allylamine acetate-diallylamine acetate copolymer, allylamine hydrochloride-dimethylallylamine hydrochloride copolymer, allylamine-dimethylallylamine copolymer, polydiallylamine hydrochloride, polymethyldiallylamine hydrochloride, polymethyldiallylamine amide sulfate, polymethyldiallylamine acetate, polydiallydimethyl ammonium chloride, diallylamine acetate-sulfur dioxide copolymer, diallylmethylethyl ammonium ethyl sulfate-sulfur dioxide copolymer, methyldiallylamine hydrochloride-sulfur dioxide copolymer, diallyldimethyl ammonium chloride-sulfur dioxide copolymer, diallyldimethyl ammonium chloride-acrylamide copolymer, and the like.

These cationic compounds may be used in combination of plural types. When at least one is selected from the polyvalent metal salt, the organic acid, and the cationic polymer among these compounds is selected, the aggregation function of the resin particles is more improved, and thus an image with better color development can be formed.

These cationic compounds can be applied to a recording medium by a proper method of, for example, applying an aqueous solution to the recording medium and then drying the solution. Also, the recording medium may be used after being dipped in a solution of the cationic compound and dried. Therefore, when the recording medium is pre-treated with the cationic compound and then used, the ink jet ink composition set can exhibit the cation responsiveness. When the recording medium is a fabric, the function of binding fluff of the surface of the medium can also be expected, and thus the ejection reliability of the composition from a recording head can be improved.

1. 7. Operational Effect Etc

The ink jet ink composition set of the embodiment can easily cause aggregation of the white pigment on the recording medium such as a fabric or the like because the white pigment contained in the white ink jet ink composition has the cation responsiveness. Therefore, a white image layer can be easily formed near the surface of the recording medium. Also, because the absolute value of zeta potential of the white pigment is lower than the absolute value of zeta potential of the nonwhite pigment, aggregation of white pigment particles more rapidly proceeds than the nonwhite pigment particles, and sedimentation also rapidly proceeds. Therefore, particularly even when the nonwhite ink jet ink composition is adhered to the recording medium without drying after the white ink jet ink composition is adhered to the recording medium, the white image layer can be easily satisfactorily formed. Thus, the white image layer and the nonwhite image layer are hardly mixed with each other, and thus the nonwhite image layer can be easily formed on the white image layer, which is satisfactorily formed near the surface of the recording medium, thereby enabling to improve the color development of an image.

In addition, when a fabric is used as the recording medium, the effect of improving color development is enhanced by forming an underlying layer using the white ink jet ink composition. The conceivable cause of this effect is that when a layer of the white ink jet ink composition is formed as an underlying layer, the ink hardly drops into a fabric, and the influence of the color of the fabric itself is decreased (particularly when the fabric has a dark color).

In addition to the effect described above, particular, even when the textile printing rate is increased by continuous printing of the white ink jet ink composition and the nonwhite ink jet ink composition, the ink jet ink composition set of the embodiment can further improve the color development by adjusting the magnitude relation between the zeta potentials of the white pigment and the nonwhite pigment as described above.

2. Ink Jet Recording Method

An ink jet recording method according to an embodiment of the present disclosure is performed by using the ink jet ink composition set described above. The ink jet recording method according to the embodiment includes adhering the white ink jet ink composition by ejecting the white ink jet ink composition and adhering the composition to a fabric, and adhering the nonwhite ink jet ink composition to a region where the white ink jet ink composition has been adhered. The adhesion of the nonwhite ink jet ink composition is performed without drying after the adhesion of the white ink jet ink composition.

2. 1. Adhesion of White Ink Jet Ink Composition

The white ink jet ink composition may be adhered by any method as long as it is configured to adhere the white ink jet ink composition while scanning a recording head on a recording medium. For example, the adhesion can be preferably performed by using a recording head and ejecting the white ink jet ink composition from the recording head. This permits small-amount various-type printing with high efficiency using a small apparatus.

2. 2. Adhesion of Nonwhite Ink Jet Ink Composition

The nonwhite ink jet ink composition may be adhered by any method as long as it is configured to adhere the nonwhite ink jet ink composition while scanning a recording head on a recording medium. For example, the adhesion is more preferably performed by using a recording head and ejecting the nonwhite ink jet ink composition from the recording head. This permits small-amount various-type printing with high efficiency using a small apparatus.

In adhering the nonwhite ink jet ink composition, the nonwhite ink jet ink composition is adhered to a region where the white ink jet ink composition has been adhered. That is, in adhering the nonwhite ink jet ink composition, the nonwhite ink jet ink composition is adhered to overlap a region where the white ink jet ink composition has been adhered. This can further improve the color development of the nonwhite image by concealing the background of the white image. In addition, when the recording medium is colored, the visibility of the formed image can be more improved.

In adhering the nonwhite ink jet ink composition, the nonwhite ink jet ink composition may be ejected from a recording head, to which the nozzle ejecting the white ink jet ink composition belongs, and adhered to the recording medium, or may be ejected from a recording head other than the recording head, to which the nozzle ejecting the white ink jet ink composition belongs.

This is preferably performed by using the same apparatus as the ink jet recording apparatus used for adhering the white ink jet ink composition. In this case, in the recording head, the nonwhite ink jet ink composition is adjusted to be ejected from a nozzle different from a nozzle which ejects the white ink jet ink composition.

This is performed without drying after adhering the white ink jet ink composition. The expression "without drying" represents that an operation such as positive heating, air blowing, pressure reduction, or the like is not performed. More specifically, the nonwhite ink jet ink composition is adhered without being allowed to stand in a temperature environment of 35° C. or more, preferably 30° C. or more, more preferably 25° C. or more, after adhering the white ink jet ink composition. The ink jet recording method according to the embodiment uses the ink jet ink composition set, and thus even when the adhesion of the nonwhite ink jet ink composition is started without drying after the completion of the adhesion of the white ink jet ink composition, an image having good color development can be formed. Therefore, the ink jet recording method of the embodiment can more rapidly form an image with good color development on a fabric.

2. 3. Time Interval of Adhesions

In the ink jet recording method according to the embodiment, the adhesion of the nonwhite ink jet ink composition is preferably started within 1 minute after the completion of the adhesion of the white ink jet ink composition. That is, the ink jet recording method according to the embodiment uses the ink jet ink composition set, and thus even when the adhesion of the nonwhite ink jet ink composition is started with a short time interval after the completion of the adhesion of the white ink jet ink composition, an image having good color development can be formed. Therefore, the ink jet recording method of the embodiment can even more rapidly form an image with good color development on a fabric.

The time until the start of the adhesion of the nonwhite ink jet ink composition after the completion of the adhesion of the white ink jet ink composition is preferably 50 seconds or less, more preferably 40 seconds or less, and still more preferably 30 seconds or less. Even with a such a short time interval, the ink jet recording method of the embodiment can form an image having good color development. In other words, in the case of printing with such a short time interval, the effect of the ink jet recording method of the embodiment is more remarkably exhibited.

2. 4. Configuration of Apparatus

In the ink jet recording method according to the embodiment, the adhesion of the nonwhite ink jet ink composition can be started with such a short time interval after the completion of the adhesion of the white ink jet ink composition, and the time interval may be achieved by properly setting the arrangement of the recording head in the ink jet recording apparatus used, the scan speed, the conveyance speed of the recording medium, or the like.

For example, when the scan speed of the recording head, the number of recording paths, or the like is adjusted so that the distance between the end of the recording head nozzle, which ejects the white ink jet ink composition, on the downstream side in the conveyance direction of the recording medium and the end of the recording head nozzle, which ejects the nonwhite ink jet ink composition, on the upstream side in the conveyance direction of the recording medium is 200 mm and the conveyance speed of the recording medium is 20 mm/s, the time until the start of the adhesion of the nonwhite ink jet ink composition after the completion of the adhesion of the white ink jet ink composition can be adjusted to 20 seconds.

2. 5. Other Processes

If required, the ink jet recording method according to the embodiment of the present disclosure may further include adhering one or more of another white ink jet ink composition and another nonwhite ink jet ink composition. In this case, the order and number of times of these adhesions are not limited, and the adhesions may be properly performed according to demand. Further, the ink jet recording method may include adhering the treatment solution, heating the recording medium (post-heating), and the like.

2. 5. 1. Adhesion of Treatment Solution

The ink jet recording method of the embodiment may include adhering the treatment solution containing the cationic compound to the recording medium. A treatment solution composition is adhered to the recording medium before the adhesion of the white ink jet ink composition.

The adhesion may be performed by coating, dipping, or the like, or may be performed by using the same apparatus as the ink jet recording apparatus used for adhering the white ink jet ink composition. In this case, an aqueous treatment solution composition is adjusted to be ejected from a nozzle different from the nozzle which ejects each of the white ink jet ink composition and the nonwhite ink jet ink composition.

2. 5. 2. Post-Heating

The ink jet recording method of the embodiment may further include post-heating the recording medium after the adhesion of the nonwhite ink jet ink composition. The post-heating is also referred to as "second heating". The post-heating can be performed by, for example, using a proper heating unit. In particular, when the recording medium is a fabric, a heating press may be used. The resultant image can be dried and more sufficiently fixed by the post-heating, and thus, for example, a recorded matter can be early put into a usable state.

2. 6. Operational Effect Etc

The ink jet recording method according to the embodiment can form an image with good color development on a fabric without heating. That is, the white pigment in the white ink jet ink composition has the cation responsiveness, and thus the white pigment is easily aggregated on the fabric. This facilitates the formation of a white image layer near the surface of the fabric. In addition, the absolute value of zeta potential of the white pigment is lower than the absolute value of zeta potential of the nonwhite pigment, and thus aggregation between the white pigment particles more easily proceeds than the nonwhite pigment particles. In particular, even when the nonwhite ink jet ink composition is adhered without drying after the white ink jet ink composition is adhered to the fabric, the white image layer can be satisfactorily formed. Thus, the white image layer and the nonwhite image layer are hardly mixed, and thus the nonwhite image layer can be easily formed on the white image layer, which is satisfactorily formed near the surface of the fabric, thereby enabling to improve the color development of an image. Therefore, the ink jet recording method can more rapidly form an image with good color development on a fabric.

3. Examples and Comparative Examples

The present disclosure is more specifically described by examples below, but the present disclosure is not limited to these examples. Hereinafter, "parts" and "%" are on a mass basis unless otherwise specified. In addition, evaluation is made in an environment at a temperature of 25.0° C. and a relative humidity of 40.0% unless otherwise specified.

3. 1. Preparation of Ink Composition

Components were placed in a vessel so as to provide the compositions of a first ink (white ink jet ink composition) and a second ink (nonwhite ink jet ink composition) described in Table 1, then mixed and stirred by a magnetic stirrer for 2 hours, and further mixed by dispersion with a beads mill filled with zirconia beads having a diameter of 0.3 mm. After stirring for 1 hour, the resultant dispersion was filtered with a PTFE-made membrane filter of 5.0 μm, preparing an ink of each of examples and comparative examples. In Table 1, a numerical value represents "% by mass". Ion exchange water was used as water and was added so that the mass of each of the inks was 100% by mass.

Titanium oxide dispersion A: C. I. Pigment White 6 (4.2 g/mL) was used as a pigment, and an anionic resin dispersant was used as a pigment dispersant. Specifically, a styrene-acrylic resin synthesized by using 55% by mass of styrene, 20% by mass of acrylic acid, and 30% by mass of methyl methacrylate was used. A mixture produced by mixing 1 part by mass of the dispersant and 10 parts by mass of ion exchange water relative to 3 parts by mass of the pigment was premixed and then dispersed with zirconia beads having a diameter of 0.03 mm at a peripheral speed of 10 m/s and a liquid temperature of 30° C. for 15 minutes using a beads mill disperser (UAM-015 manufactured by Kotobuki Kogyou Co., Ltd.), and then coarse particles were centrifugally separated by a centrifugal separator (Model-3600 manufactured by Kuboyama Shoji Co., Ltd.) to produce the titanium oxide dispersion A.

Titanium oxide dispersion B: The titanium oxide dispersion B was produced by the same operation as for the titanium oxide dispersion A except that C. I. Pigment White 6 (4.2 g/mL) was used as a pigment, and a nonionic urethane resin was used as a dispersant.

TABLE 1

| | | | Example | | | | Comparative Example | | | |
|---|---|---|---|---|---|---|---|---|---|---|
| | (% by mass) | | 1 | 2 | 3 | 4 | 1 | 2 | 3 | 4 |
| First ink (lower layer) | Solid content of titanium oxide dispersion A (with cation responsiveness) | | 10.0 | 10.0 | 10.0 | 10.0 | — | — | — | — |
| | Solid content of titanium oxide dispersion B (without cation responsiveness) | | — | — | — | — | 10.0 | 10.0 | 10.0 | 10.0 |
| | Urethane resin solid content (with cation responsiveness) (Takelac WS-6021) | | 10.0 | 10.0 | 10.0 | 10.0 | 10.0 | 10.0 | 10.0 | 10.0 |
| | Glycerin | | 10.0 | 10.0 | 10.0 | 10.0 | 10.0 | 10.0 | 10.0 | 10.0 |
| | Triethylene glycol | | 5.0 | 5.0 | 5.0 | 5.0 | 5.0 | 5.0 | 5.0 | 5.0 |
| | Triethylene glycol monobutyl ether | | 1.0 | 1.0 | 1.0 | 1.0 | 1.0 | 1.0 | 1.0 | 1.0 |
| | 2-Pyrrolidone | | 2.0 | 2.0 | 2.0 | 2.0 | 2.0 | 2.0 | 2.0 | 2.0 |
| | BYK-348 | | 0.3 | 0.3 | 0.3 | 0.3 | 0.3 | 0.3 | 0.3 | 0.3 |
| | Ion exchange water | | Balance | Balance | Balance | Balance | Balance | Balance | Balance | Balance |
| Second ink (upper layer) | Pigment concentration of yellow pigment dispersion (with cation responsiveness) | | 3.0 | — | — | — | 3.0 | — | — | — |
| | Pigment concentration of magenta pigment dispersion (with cation responsiveness) | | — | 3.0 | — | — | — | 3.0 | — | — |
| | Pigment concentration of cyan pigment dispersion (with cation responsiveness) | | — | — | 3.0 | — | — | — | 3.0 | — |
| | Pigment concentration of black pigment dispersion (with cation responsiveness) | | — | — | — | 3.0 | — | — | — | 3.0 |
| | Urethane resin solid content (with cation responsiveness) (Takelac WS-6021) | | 4.0 | 4.0 | 4.0 | 4.0 | 4.0 | 4.0 | 4.0 | 4.0 |
| | Glycerin | | 10.0 | 10.0 | 10.0 | 10.0 | 10.0 | 10.0 | 10.0 | 10.0 |
| | Triethylene glycol | | 5.0 | 5.0 | 5.0 | 5.0 | 5.0 | 5.0 | 5.0 | 5.0 |
| | Triethylene glycol monobutyl ether | | 1.0 | 1.0 | 1.0 | 1.0 | 1.0 | 1.0 | 1.0 | 1.0 |
| | 2-Pyrrolidone | | 2.0 | 2.0 | 2.0 | 2.0 | 2.0 | 2.0 | 2.0 | 2.0 |
| | BYK-348 | | 0.3 | 0.3 | 0.3 | 0.3 | 0.3 | 0.3 | 0.3 | 0.3 |
| | Ion exchange water | | Balance | Balance | Balance | Balance | Balance | Balance | Balance | Balance |
| Image quality (white ink) | Max L* | | 94 | 94 | 94 | 94 | 94 | 94 | 94 | 94 |
| Image quality (color development of color ink on white ink) | Yellow ink (Max a*) | | A | — | — | — | B | — | — | — |
| | Magenta ink (Max b*) | | — | A | — | — | — | B | — | — |
| | Cyan ink (Min b*) | | — | — | A | — | — | — | B | — |
| | Black ink (Max ODBlack) | | — | — | — | A | — | — | — | B |

Among the components shown in Table 1, a surfactant is trade name "BYK (registered trade name)-348" manufactured by BYK-Chemie Japan K. K., polyether-modified organosiloxane surfactant. In addition, "Takelac WS-6021" is urethane-based resin particles having cation responsiveness.

The titanium oxide dispersion A and titanium oxide dispersion B used were prepared as follows.

In addition, each of the nonwhite pigment dispersions used was prepared as follows:

Magenta pigment dispersion: The magenta pigment dispersion was produced by the same operation as for the titanium oxide dispersion A except that C. I. Pigment Red 122 (1.35 to 1.55 g/mL) was used.

Cyan pigment dispersion: The cyan pigment dispersion was produced by the same operation as for the titanium oxide dispersion A except that C. I. Pigment Blue 15:3 (1.5 to 1.7 g/mL) was used.

Yellow pigment dispersion: The yellow pigment dispersion was produced by the same operation as for the titanium oxide dispersion A except that C. I. Pigment Yellow 155 (1.3 to 1.5 g/mL) was used.

Black pigment dispersion: The black pigment dispersion was produced by the same operation as for the titanium oxide dispersion A except that Microjet CW1 (1.8 to 1.9 g/mL) (manufactured by Orient Chemical Industries Co., Ltd.) was used.

In addition, the specific gravity of each of the pigments is shown in the parenthesis.

The cation responsiveness of each of the pigment dispersions and the resins was evaluated as follows. In a glass bottle with a volume of 30 cc, 15 cc of a 2% aqueous calcium nitrate solution was placed. Then, each of the pigment dispersions and resin dispersions was dropped on the solution in the glass bottle by using a dropper, and when the dispersion dropped was solidified and separated from the treatment solution to create a state of floating on the water surface or being settled at the bottle bottom, the dispersion was evaluated as having the cation responsiveness. While when the dispersion dropped by the dropper was not solidified by contact with the treatment solution and not clearly separated, and was totally dispersed by dissolution or clouding, the dispersion was evaluated as not having the cation responsiveness.

3. 2. Zeta Potential

The zeta potential of each of the pigments was measured. In measurement, a cell for measuring zeta potential (DTS 1070 manufactured by Malvern Ltd.) was filled with a dilute solution of each pigment, and the zeta potential was measured by using a zeta potential analyzer (Zetasizer Nano ZS manufactured by Malvern Ltd.) in an environment at a room temperature (20° C. to 25° C.). In any case, the dilution rate was $1 \times 10^{-4}$ [mol/L]. The results are shown below.

Solid content of the titanium oxide dispersion (having the cation responsiveness): −61 [mV]
Solid content of the titanium oxide dispersion (not having the cation responsiveness): −52 [mV]
Solid content of the yellow pigment dispersion (having the cation responsiveness): −63 [mV]
Solid content of the magenta pigment dispersion (having the cation responsiveness): −65 [mV]
Solid content of the cyan pigment dispersion (having the cation responsiveness): −65 [mV]
Solid content of the black pigment dispersion (having the cation responsiveness): −69 [mV]

3. 3. Evaluation Method

3. 3. 1 Preparation of Fabric

A modified machine of SC-F2000 (manufactured by Seiko Epson Corporation) was used an evaluation apparatus. First, 20 g of a pretreatment solution below was coated on a A-4 size region of a 100%-cotton black T-shirt (manufactured by Printstar, Ltd.) and then dried by using a heat press dryer (AF-54TEN manufactured by Asahi Seni Co., Ltd., lower iron dimensions: 500 mm×400 mm) under the conditions of 170° C., 45 seconds, and 4.5 kN, and used as an evaluation recording medium.

Pretreatment Solution Composition
Polyvalent metal salt: calcium nitrate tetrahydrate: 5% by mass, manufactured by Kanto Chemical Co., Ltd.
Resin dispersion: Vinylblan 1245L (solid content 40%): 1% by mass (in terms of solid content) acrylic copolymer aqueous emulsion, manufactured by Japan Coating Resin Corporation
Surfactant: Olfine E1010: 0.1 mass % acetylene-based surfactant, manufactured by Nissin Chemical Industry Co., Ltd.
Solvent: ion exchange water: balance

3. 3. 2. Evaluation of Color Development

The coating amount of the first ink was adjusted so that the resolution was 1440×1440 dpi, the number of nozzles used was 360 nozzles/line×4 lines, the number of times of printing was 2, and the amount of ink ejected was 30 ng/dot. The coating amount of the second ink was adjusted so that the resolution was 1440×720 dpi, the number of nozzles used was 360 nozzles/line×1 line, the number of times of printing was 1, and the amount of ink ejected was 30 ng/dot.

The first ink was coated on the evaluation recording medium, and then the second ink was coated to overlap the region where the first ink had been coated. In any case, the time from the completion of coating of the first ink until the start of coating of the second ink was within 15 seconds. The evaluation was performed from the start of coating of the first ink to the completion of coating of the second ink in an environment at a temperature of 25.0° C. and a relative humidity of 40.0%, and heating treatment was not performed between the completion of coating of the first ink and the start of coating of the second ink. That is, the temperature near the fabric surface was substantially the same as the environmental temperature from the start of coating of the first ink to the completion of coating of the second ink. Specifically, the temperature was 28.0° C. or less.

After the completion of printing of the second ink, the fabric coated with the ink was dried by using a heat press dryer (AF-54TEN manufactured by Asahi Seni Co., Ltd., lower iron dimensions: 500 mm×400 mm) under the heating conditions of 170° C., 60 seconds, and 4.5 kN.

In colorimetry, L*, a*, b*, and ODBlack values were measured by using a fluorescent spectrodensitometer (Konica Minolta, Inc., FD-7). The obtained values were evaluated according to criteria below, and the results are shown in Table 1. In addition, the measurement results of the Max L* value of a white ink are shown in Table 1.

Evaluation Criteria

The color development of the yellow ink with a Max a* value of 92 or more was evaluated as "A", and that with a Max a* value of less than 92 was evaluated as "B".

The color development of the magenta ink with a Max b* value of 55 or more was evaluated as "A", and that with a Max b* value of less than 55 was evaluated as "B".

The color development of the cyan ink with a Min b* value of −42 or less was evaluated as "A", and that with a Min b* value of over −42 was evaluated as "B".

The color development of the black ink with a Max OD value of 1.3 or more was evaluated as "A", and that with a Max OD value of less than 1.3 was evaluated as "B".

3. 4. Evaluation Results

In any one of the examples in which the white ink jet ink composition contained the white pigment having the cation responsiveness, the resin particles, and water, and the nonwhite ink jet ink composition contained the nonwhite pigment, the resin particles, and water, and in which the absolute value of zeta potential of the white pigment was lower the absolute value of zeta potential of the nonwhite pigment, the ink jet ink composition set showed good color development. On the other hand, the comparative examples using the white pigment not having the cation responsiveness showed poor color development.

The embodiments described above and modified examples are only example, and the present disclosure is not limited to these. For example, each of the embodiments and each of the modified examples can be properly combined.

The present disclosure includes substantially the same configuration as described in the embodiments, for example, a configuration having the same function, method, and results, or a configuration having the same object and effect. In addition, the present disclosure includes a configuration in which a portion unnecessary in the configurations described in the embodiments is replaced. Also, the present disclosure includes a configuration which exhibits the same operational effect as the configurations described in the embodiments or a configuration which can achieve the same object as the configurations described in the embodiments. Further, the present disclosure includes a configuration in which a known technique is added to the configurations described in the embodiments.

The following contents are derived from the embodiments and modified examples described above.

An according to an aspect, an ink jet ink composition set is a set of a white ink jet ink composition and a nonwhite ink jet ink composition, in which the white ink jet ink composition contains a white pigment, resin particles, and water, the nonwhite ink jet ink composition contains a nonwhite pigment, resin particles, and water, the white pigment has cation responsiveness, and the absolute value of zeta potential of the white pigment is lower than the absolute value of zeta potential of the nonwhite pigment.

The ink jet ink composition set can easily cause aggregation of the white pigment on a recording medium, such as a fabric or the like, because the white pigment contained in the white ink jet ink composition has the cation responsiveness. Therefore, a white image layer can be easily formed near the surface of the recording medium. Also, because the absolute value of zeta potential of the white pigment is lower than the absolute value of zeta potential of the nonwhite pigment, aggregation between white pigment particles more rapidly proceeds than the nonwhite pigment particles. In particular, even when the nonwhite ink jet ink composition is adhered to the recording medium without drying after the white ink jet ink composition is adhered to the recording medium, the white image layer can be easily satisfactorily formed. Thus, the white image layer and the nonwhite image layer are hardly mixed with each other, and thus the nonwhite image layer can be easily formed on the white image layer satisfactorily formed near the surface of the recording medium, thereby enabling to improve the color development of an image.

In the ink jet ink composition set according to the aspect described above, one or two or more of the nonwhite pigment and the resin particles contained in the nonwhite ink jet ink composition may have the cation responsiveness.

The ink jet ink composition set can more improve the color development a nonwhite image.

In the ink jet ink composition set according to the aspect described above, the nonwhite pigment in the nonwhite ink jet ink composition may have the cation responsiveness.

The ink jet ink composition set can further improve the color development a nonwhite image.

In the ink jet ink composition set according to the aspect described above, the set is used for textile printing of a fabric, and the fabric may be a fabric treated with a cationic compound.

The ink jet ink composition set enables easier textile printing of an image with good color development on a fabric.

In the ink jet ink composition set according to the aspect described above, the white pigment may contain titanium oxide.

The ink jet ink composition set can further improve the color development of a white image.

In the ink jet ink composition set according to the aspect described above, the specific gravity of the white pigment may be higher than the specific gravity of the nonwhite pigment.

The ink jet ink composition set can further improve the color development because the white image and the nonwhite image are more hardly mixed.

In the ink jet ink composition set according to the aspect described above, the resin particles in the white ink jet ink composition may have cation responsiveness.

The ink jet ink composition set can form an image with better color development because the aggregability of the component in the white ink jet ink composition is further enhanced.

In the ink jet ink composition set according to the aspect described above, the nonwhite ink jet ink composition may be used by being adhered to overlap a region where the white ink jet ink composition is adhered.

The ink jet ink composition set can further improve the color development of a nonwhite image by background hiding with the white image. In addition, when the recording medium is colored, the visibility of the formed image can be more improved.

In the ink jet ink composition set according to the aspect described above, the white ink jet ink composition and the nonwhite ink jet ink composition may have a surface tension of 20 mN/m or more and 35 mN/m or less.

The ink jet ink composition set can further improve the ejection stability and initial filling properties during ink jet recording.

According to an aspect of the present disclosure, an ink jet recording method is performed by using any one of the ink jet ink composition sets according to the aspect described above, and includes adhering the white ink jet ink composition to a fabric by ejecting the white ink jet ink composition and adhering the nonwhite ink jet ink composition to a region where the white ink jet ink composition has been adhered. The nonwhite ink jet ink composition is adhered without drying after the white ink jet ink composition is adhered.

The ink jet recording method can form an image with good color development on a fabric without drying. That is, the white pigment in the white ink jet ink composition has the cation responsiveness, and thus the white pigment is easily aggregated on the fabric. This facilitates the formation of a white image layer near the surface of the fabric. In addition, the absolute value of zeta potential of the white pigment is lower than the absolute value of zeta potential of the nonwhite pigment, and thus aggregation between the white pigment particles more easily proceeds than the nonwhite pigment particles. In particular, even when the nonwhite ink jet ink composition is adhered without drying after the white ink jet ink composition is adhered to the fabric, the white image layer can be satisfactorily formed. Thus, the white image layer and the nonwhite image are hardly mixed, and thus the nonwhite image layer can be easily formed on the white image layer satisfactorily formed near the surface of the fabric, thereby enabling to improve the color development of an image. Therefore, the ink jet recording method can even more rapidly form an image with good color development on a fabric.

In the ink jet recording method according to the aspect, the adhesion of the nonwhite ink jet ink composition may be started within 1 minute after the completion of the adhesion of the white ink jet ink composition.

The ink jet recording method can more rapidly form an image with good color development on a fabric.

What is claimed is:

1. An ink jet ink composition set comprising:
   a white ink jet ink composition; and
   a nonwhite ink jet ink composition,
   wherein the white ink jet ink composition contains a white pigment, resin particles, and water;
   the nonwhite ink jet ink composition contains a nonwhite pigment, resin particles, and water, the nonwhite pigment being at least one of a cyan pigment a yellow pigment, a magenta pigment, and a black pigment;
   the white pigment has cation responsiveness; and
   the absolute value of zeta potential of the white pigment is lower than the absolute value of zeta potential of the nonwhite pigment.

2. The ink jet ink composition set according to claim 1, wherein one or two or more of the nonwhite pigment and the resin particles contained in the nonwhite ink jet ink composition have the cation responsiveness.

3. The ink jet ink composition set according to claim 1, wherein the nonwhite pigment in the nonwhite ink jet ink composition has the cation responsiveness.

4. The ink jet ink composition set according to claim 1, wherein the set is used for textile printing on a fabric, and the fabric is a fabric treated with a cationic compound.

5. The ink jet ink composition set according to claim 1, wherein the white pigment contains titanium oxide.

6. The ink jet ink composition set according to claim 1, wherein the specific gravity of the white pigment is higher than the specific gravity of the nonwhite pigment.

7. The ink jet ink composition set according to claim 1, wherein the resin particles in the white ink jet ink composition have cation responsiveness.

8. The ink jet ink composition set according to claim 1, wherein the nonwhite ink jet ink composition is used by being adhered to overlap a region where the white ink jet ink composition is adhered.

9. The ink jet ink composition set according to claim 1, wherein the white ink jet ink composition and the nonwhite ink jet ink composition have a surface tension of 20 mN/m or more and 35 mN/m or less.

10. An ink jet recording method performed by using the ink jet ink composition set according to claim 1, the method comprising:
    adhering the white ink jet ink composition to a fabric by ejecting the white ink jet ink composition; and
    adhering the nonwhite ink jet ink composition to a region where the white ink jet ink composition has been adhered,
    wherein the nonwhite ink jet ink composition is adhered without drying after the white ink jet ink composition is adhered.

11. The ink jet recording method according to claim 10, wherein the adhesion of the nonwhite ink jet ink composition is started within 1 minute after the completion of the adhesion of the white ink jet ink composition.

* * * * *